US009341488B2

(12) United States Patent
Mund et al.

(10) Patent No.: US 9,341,488 B2
(45) Date of Patent: May 17, 2016

(54) TIME AND/OR ACCURACY DEPENDENT WEIGHTS FOR NETWORK GENERATION IN A DIGITAL MAP

(75) Inventors: Heiko Mund, Hildesheim (DE); Clayton Richard Morlock, Lebanon, NH (US)

(73) Assignees: TomTom North America Inc., Lebanon, NH (US); TomTom Germany GmbH & Co. KG, Harsum (DE)

(*) Notice: Subject to any disclaimer, the term of this patent is extended or adjusted under 35 U.S.C. 154(b) by 181 days.

(21) Appl. No.: 13/518,922

(22) PCT Filed: Dec. 23, 2010

(86) PCT No.: PCT/US2010/061973
§ 371 (c)(1),
(2), (4) Date: Sep. 10, 2012

(87) PCT Pub. No.: WO2011/079247
PCT Pub. Date: Jun. 30, 2011

(65) Prior Publication Data
US 2013/0021382 A1  Jan. 24, 2013

Related U.S. Application Data

(60) Provisional application No. 61/289,429, filed on Dec. 23, 2009.

(51) Int. Cl.
G01C 21/32 (2006.01)
(52) U.S. Cl.
CPC ..................................... *G01C 21/32* (2013.01)
(58) Field of Classification Search
None
See application file for complete search history.

(56) References Cited

U.S. PATENT DOCUMENTS

| 6,047,234 A | 4/2000 | Cherveny et al. |
| 6,154,152 A | 11/2000 | Ito |
| 6,385,539 B1 | 5/2002 | Wilson et al. |

(Continued)

FOREIGN PATENT DOCUMENTS

| CN | 1530635 A | 9/2004 |
| CN | 101388144 A | 3/2009 |

(Continued)

OTHER PUBLICATIONS

Aggarwal, et al., A Framework for Clustering Massive Text and Categorical Data Streams, ACM SIAM converence on data mining, 2006, 479-483.*

(Continued)

*Primary Examiner* — Barry Drennan
*Assistant Examiner* — Diana Hickey

(57) ABSTRACT

A method for improving and extending an existing digital road network and generating new networks from statistically relevant amounts of probe data recorded by GPS-enabled navigation devices. New probe data is matched to the existing digital map, then the data merged into the existing network using a time-dependent weight and/or accuracy-dependent weight. A recalculation date is established, and the weight value of a line segment and/or trace is adjusted as a function of the time span relative to the recalculation. The function may include setting a maximal time period divided into bins each having a respective weight reduction factor, or applying decay function. Through this technique, digital maps can be updated and extended without undue influence exerted by old trace data.

17 Claims, 7 Drawing Sheets

(56) References Cited

U.S. PATENT DOCUMENTS

| | | | |
|---|---|---|---|
| 6,401,027 B1* | 6/2002 | Xu et al. | 701/117 |
| 6,420,997 B1 | 7/2002 | Cong | |
| 6,674,434 B1 | 1/2004 | Chojnacki et al. | |
| 6,915,205 B2 | 7/2005 | Kim et al. | |
| 7,516,041 B2 | 4/2009 | Smartt et al. | |
| 7,542,844 B2 | 6/2009 | Kumagai et al. | |
| 7,706,965 B2 | 4/2010 | Downs et al. | |
| 2004/0208385 A1 | 10/2004 | Jiang | |
| 2006/0155464 A1* | 7/2006 | Smartt | 701/208 |
| 2007/0129892 A1 | 6/2007 | Smartt et al. | |
| 2008/0040030 A1* | 2/2008 | Oohashi | 701/208 |
| 2008/0046165 A1 | 2/2008 | Downs et al. | |
| 2009/0070025 A1 | 3/2009 | Kumagai et al. | |
| 2009/0100031 A1 | 4/2009 | Gilligan et al. | |
| 2009/0210147 A1* | 8/2009 | Bauer et al. | 701/206 |
| 2009/0254572 A1 | 10/2009 | Redlich et al. | |
| 2012/0277993 A1 | 11/2012 | Mund | |

FOREIGN PATENT DOCUMENTS

| | | |
|---|---|---|
| JP | H11119647 A | 4/1999 |
| JP | H11249552 A | 9/1999 |
| JP | 2001116570 A | 4/2001 |
| JP | 2001201358 A | 7/2001 |
| JP | 2003279358 A | 10/2003 |
| JP | 2003536096 A | 12/2003 |
| JP | 2006236098 A | 9/2006 |
| JP | 2007171641 A | 7/2007 |
| JP | 2008065087 A | 3/2008 |
| JP | 2010210948 A | 9/2010 |
| JP | 2013508692 A | 3/2013 |

OTHER PUBLICATIONS

International Search Report issued Mar. 4, 2011 for International Application No. PCT/US10/61973.

* cited by examiner

TIME AND/OR ACCURACY DEPENDENT WEIGHTS FOR NETWORK GENERATION IN A DIGITAL MAP

CROSS-REFERENCE TO RELATED APPLICATIONS

This application is the National Stage of International Application No. PCT/US10/61973, filed Dec. 23, 2010 and designating the United States. The entire content of this application is incorporated herein by reference. This application claims priority to U.S. Provisional Patent Application No. 61/289,429 filed Dec. 23, 2009. The entire content of this application is also incorporated herein by reference.

BACKGROUND OF THE INVENTION

1. Field of the Invention

This invention relates generally to a method for generating, updating and extending digital maps, such as digital vector maps, using probe data, and more generally toward a method for improving data mining activities using advanced time models.

2. Related Art

Navigation systems, electronic maps (also known as digital maps), and geographical positioning devices are increasingly used by travelers to assist with various navigation functions, such as to determine the overall position and orientation of the traveler and/or vehicle, find destinations and addresses, calculate optimal routes, and provide real-time driving guidance. Typically, the navigation system includes a small display screen or graphic user interface that portrays a network of streets as a series of line (or road) segments. The traveler can be generally located on the digital map close to or with regard to a road or street.

Digital maps are expensive to produce and update, since collecting and processing road information is very costly. Surveying methods or digitizing satellite images are commonly employed techniques for creating a digital map. Furthermore, digital maps are likely to contain inaccuracies or systematic errors due to faulty or inaccurate input sources or flawed inference procedures. Once a digital map has been created, it is costly to keep map information up to date, since road geometry changes over time. In some regions of the world, digital maps are not available at all.

It may be the case that an existing roadway map or network is incomplete in its depiction of all roadways or paths within a given region. Furthermore, due to the evolving nature of networks which may include but are not limited to roadways and paths, changes may occur over time such that an existing digital map may no longer accurately portray current conditions.

In recent years, probe data (also commonly referred to as "probe traces") has been used to create and update digital maps of transportation networks, e.g. navigable systems of roads, pedestrian walkways, paths, rivers, shipping lanes or other networks that can be used to transport humans or vehicles. Probe traces are a plurality of sequential location measurements from location sensors housed in a plurality of vehicles or carried by a plurality of pedestrians. For example, the location sensors can be satellite navigation signal receivers, e.g. GPS systems.

One class of algorithms used generating networks from probe data are known as incremental algorithms. Incremental algorithms have several advantages, although other non-incremental network generation algorithms are also useful and sometimes preferred. One primary advantage of incremental algorithms is that an incremental approach allows extending and improving a network without need to process the whole network again. Examples of incremental map generation algorithms can be found in U.S. Pat. No. 6,385,539 and in the Applicant's co-pending PCT application titled "INCREMENTAL MAP GENERATION, REFINEMENT AND EXTENSION WITH GPS TRACES" by inventor H. Mund (PCT/EP2009/063938 filed 22 Oct. 2009). The techniques described in this latter PCT application are referred to hereafter as the Viae Novae algorithm.

It is known from the Viae Novae algorithm, for example, to take probe data inputs from low-cost positioning systems and handheld devices and mobile phones with integrated GPS functionality for the purpose of incrementally learning a map using certain clustering technologies. The input to be processed consists of recorded GPS traces in the form of, for example, a standard ASCII stream, which is supported by almost all existing GPS devices. The output is a road map in the form of a directed graph with nodes and edges annotated with travel time information. Travelers appropriately fitted with navigation devices and traversing a main trunk and/or branch junction may thus create a trace map, with nodes created at regular distances. The nodes and edges are stored in a digital vector map table or database. Through this technique which represents an incremental approach, road geometry can be inferred, and the collected data points refined by filtering and partitioning algorithms.

FIG. 1 describes this exemplary incremental approach in terms of a simplified flow process. A plurality of probes 14 are depicted as GPS-enabled personal navigation devices such as those manufactured by TomTom NV (www.tomtom.com). However, any suitable device with GPS functionality may be used to generate probe data points, including handheld devices, mobile phones, PDAs, and the like. The probe data points may be collected and stored in a probe data table 16 or other suitable database or repository. The existing digital vector map, in this example a previously created digital map, is contained in a table 18. Of course, the digital vector map 18 can exist as a database or in other suitable form. Trace lines are generated from the rough probe data in table 16 as an initial step. A new line is selected from the probe data table at step 20. The selected line is matched to the digital vector map at step 22. During this step, each point of the trace line will be associated with a network element using a suitable map matching method. If the matching method is not able to associate any network element to the trace line, the probe data point is marked as "unmatched." All other probe data points are attempted to be matched to the existing network in this manner. For trace line segments whose data points are not matched to any element of the existing network, these must be split from the network elements and inserted, i.e., connected, via a new or existing junction. This occurs in step 24. In some cases, it is reasonable to use a known or pre-existing junction. Junctions may be referred to as intersections in a roadway network application. Once the matching and junction steps 22, 24 have been completed, the trace line segments are merged with the associated network elements at step 26. This may be accomplished with merge suitable algorithms and methodology. Finally, to reduce the number of shape points, it is possible to simplify the network element before updating the network table at step 18. This optional simplification step is indicated at function block 28 and can be accomplished through various techniques, including by application of the well-known Douglas-Peucker algorithm.

New trace data which are available can be used in this manner to easily refine and extend a road network in a digital map system. When using an incremental approach as described above, it is not possible to remove old data from the generated road network. A problem, however, lies in that the remnant of old, possibly outdated, trace data will be factored into the incremental algorithms when analyzing the extent to which a network is to be extended or improved, and thus continue to exert influence over the analysis. The usage and importance of a road element is described by its weight value. If a road segment is not in use anymore, it may have still a high weight and therefore continue to negatively influence the map refinement and extension exercises.

Accordingly, there is a need for an improved method for updating and extending digital vector maps using probe or trace data, and that is not susceptible to the negative influence of old, possibly outdated, trace data. The method should be useful in conjunction with both incremental and non-incremental network generation algorithms.

SUMMARY OF THE INVENTION

This invention, at least in preferred embodiments, overcomes the shortcomings and deficiencies of the various prior art techniques by providing a method for generating, refining and/or extending a digital map, such as a digital vector map, using traces derived from probe data. The digital map is preferably a transportation network, wherein the line segments represent at least a portion of a road, path or the like.

Accordingly, in a first aspect of the invention, there is provided a method for generating, refining and/or extending a digital map using traces derived from probe data, said digital map storing a plurality of line segments spatially associated within a coordinate system, at least one, and preferably all, of the line segments having an associated segment weight value, the method comprising the steps of: providing at least one probe trace having a defined creation date; assigning a trace weight value to the at least one probe trace; adjusting the position of a line segment associated with the at least one probe trace based on the segment weight value of the line segment and the trace weight value; and adjusting the trace weight value and/or the segment weight value as a function of the time span between a recalculation date and the trace creation date. For the avoidance of doubt, the recalculation date refers to data later in time than the trace creation date.

Preferably, at least one, and preferably all, of the line segments have a computed centreline and the step of adjusting the position of a line segment comprises re-calculating the centreline of the line segment, optionally using a weighted average of the segment and trace weight values.

According to a second aspect of the invention, there is provided a method for generating, refining and/or extending a digital map using traces derived from probe data, said digital map storing a plurality of line segments spatially associated within a coordinate system, at least one, and preferably all, of the line segments having an associated segment weight value, the method comprising the steps of: providing at least one probe trace having a defined creation date; assigning a trace weight value to the at least one probe trace; creating a line segment associated with the at least one probe trace; assigning a segment weight value to the line segment based on the trace weight value; and adjusting the trace weight value and/or the segment weight value as a function of the time span between a recalculation date and the trace creation date.

Preferably, at least one, and preferably all, of the line segments have a computed centreline and the step of creating a line segment comprises calculating a centreline for the line segment.

In a preferred embodiment, the step of providing at least one probe trace comprises providing a plurality of probe traces each having a different creation date; and the step of assigning a trace weight value to the at least one probe trace comprises assigning the same trace weight value to each of the plurality of probe traces at the respective creation date of the probe trace.

In a preferred embodiment, the step of adjusting the trace weight value and/or the segment weight value comprises reducing the trace weight value as a function of the time span between the recalculation date and the trace creation date.

In a preferred embodiment, additionally or alternatively, the step of adjusting the trace weight value and/or the segment weight value comprises: defining a maximal time period; and assigning a null trace weight value if the time span between the recalculation date and the trace creation date exceeds the maximal time period. The method preferably further comprises the steps of: dividing the maximal time period into a plurality of bins, each bin representing a respective portion of time between the recalculation date and the maximal time period; assigning each bin a factor; associating the trace with a specified one of the bins corresponding to the trace creation date; and calculating the trace weight value as a function of the factor assigned to the bin associated with the trace. Preferably, the segment weight value is calculated as a sum of the weights of the bins.

In a preferred embodiment, additionally or alternatively, the method further comprises defining a half-life time (T) and a decay function, preferably an exponential decay function. The adjusting step including computing at least one of the segment weight value and trace weight value as a function of the half-life time (T) and the decay function. The computing step includes altering the trace weight value and/or the segment weight value as a function of the half-life time (T) and the decay function.

In a preferred embodiment, additionally or alternatively, the step of assigning a trace weight value includes assigning an equal and common initial weight value to a plurality of traces having different respective creation dates.

In a preferred embodiment, a line segment is removed from the digital map when the segment weight value of the line segment falls below a predetermined threshold. Alternatively, a predicted expiry date may be determined for a line segment based on when the segment weight value will fall below a predetermined threshold value, and the line segment is removed from the digital map when the expiry date is reached. The predicted expiry date is preferably adjusted, e.g. extended, as additional probe traces associated with the line segment are provided. The predetermined threshold may be zero or a value greater than zero.

Preferably, additionally or alternatively, the trace weight value assigned to the at least one probe trace is based on at least one accuracy and/or precision criteria of the acquisition system used to obtain the probe trace.

According to a third aspect of the invention, there is provided a method for generating, refining and/or extending a digital map using traces derived from probe data, said digital map storing a plurality of line segments spatially associated within a coordinate system, at least one, and preferably all, of the line segments having an associated segment weight value, the method comprising the steps of: providing at least one probe trace obtained by an acquisition system having location determining means; assigning a trace weight value to the at least one probe trace, wherein the trace weight value is based on at least one accuracy and/or precision criteria of the acquisition system; and adjusting the position of a line segment associated with the at least one probe trace based on the segment weight value of the line segment and the trace weight value.

According to a fourth aspect of the invention, there is provided a method for generating, refining and/or extending a digital map using traces derived from probe data, said digital map storing a plurality of line segments spatially associated within a coordinate system, at least one, and preferably all, of the line segments having an associated segment weight value, the method comprising the steps of: providing at least one probe trace obtained by an acquisition system having location determining means; assigning a trace weight value to the at least one probe trace, wherein the trace weight value is based on at least one accuracy and/or precision criteria of the acquisition system; creating a line segment associated with the at least one probe trace; and assigning a segment weight value to the line segment based on the trace weight value.

In a preferred embodiment, the acquisition system comprises a satellite navigation signal receiver, such as a GPS receiver, and the at least one accuracy and/or precision criteria comprises data indicative of the accuracy of the received satellite signals. The at least one accuracy and/or precision criteria may also or alternatively comprise the type of acquisition system. For example, the acquisition system may comprise a personal navigation device (PND) with GPS receiver, a smart phone with GPS receiver or an assisted GPS system.

The accuracy and/or precision criteria can, for example, include a characteristic of the acquisition (or sensor) system, weather data, tree cover data, urban canyon data and/or terrain data (i.e. at the time the probe trace is generated). The characteristic of the sensor system can be at least one, or preferably a plurality, of: a measurement sample rate; speed of acquiring satellite or broadcast tower fix; number of satellites or broadcast towers in line-of-sight; correction methodology of multipath reflections; preferential usage of satellites; number of satellites that can be locked onto at once; correction of clock timing drift; ephemeris data; assisted GPS or non-assisted GPS (e.g. can it triangulate on cell or TV tower signals, is it equipped with inertial guidance); differential GPS or non-differential GPS (e.g. does it use a stationary-based station in addition to satellites); predictive filters; error correcting software; and knowledge of the environmental conditions during the measurement.

The present invention therefore relates to the use of time-depending weight values for line segments and/or traces in combination with algorithms used to update and refine digital maps. The invention enables greater efficiency in map making and refinement processes by avoiding re-computation of a whole network through the step of strategically adjusting the weight of data based on its age. The invention is suitable for use with both incremental and non-incremental network generation algorithms. The same time models are useful also for other data mining activities. For example, the invention relates to all time-depending data, for spatial data as well as non-spatial data.

In other aspects of the invention, the weights can additionally or alternatively depend on the accuracy of the probe trace, and other quality measures. For example, it will be understood that different types of probes, and even the same type of probe at different times and locations, can have differences in accuracy and/or precision. As an example, location sensor resolution from a moving vehicle or a pedestrian can vary from +/- about 5 to about 10 meters for GPS and greater for other location determining devices. Further, most location sensors are adversely affected by obstacles such as tall buildings or tunnels in the way of a line-of-sight view of the reference for the sensor. For example, the GPS signal can bounce of buildings, trees, water surfaces or the like (e.g. multi-path drift), so that the travel time may not be the direct line of sight, but reflected off a nearby surface.

By this method, an already existing digital map, e.g. digital vector map, such as that used for road maps, bicycle maps and footpath maps and the like, can be improved using collected probe data. The improved quality of the digital vector map can be used to more accurately detect branches, merges and crossings in the digital vector map, may be used to generate both unidirectional and bidirectional networks, and represents a substantial efficiency improvement when computing large amounts of probe data over a large network area. The method is also applicable to generating digital maps, such as road maps and the like, using collected probe data.

DETAILED DESCRIPTION OF THE PREFERRED EMBODIMENT

Nowadays vehicle probe data are used to hold road networks up-to-date. With different approaches it is possible to generate a new network from probe data. One class of algorithms are incremental algorithms. They have several advantages. The incremental approach allows extending and improving a network without to process the whole network again. Such an algorithm is described in the Viae Novae algorithm.

New data which are available can be easy used to refine and extend the already existing road network. However it is not possible to remove old data from the generated road network. The usage and importance of a road element is described with reference to its weight value. If a road segment is not in use anymore it may have still a high weight. In order to avoid a re-computing of the whole network one can reduce the weight of old data.

Three different, alternative, time management approaches are introduced below. All three approaches are suitable for the Viae Novae algorithm as well as other (incremental and non-incremental) network generation algorithms. The same time models are useful also for other data mining activities. The application is meaningful for all time-depending data, for spatial data as well as for non-spatial data. Moreover it is possible to combine two or more of the three time-depending methods in order to use the advantages of the different approaches.

Figure 1:
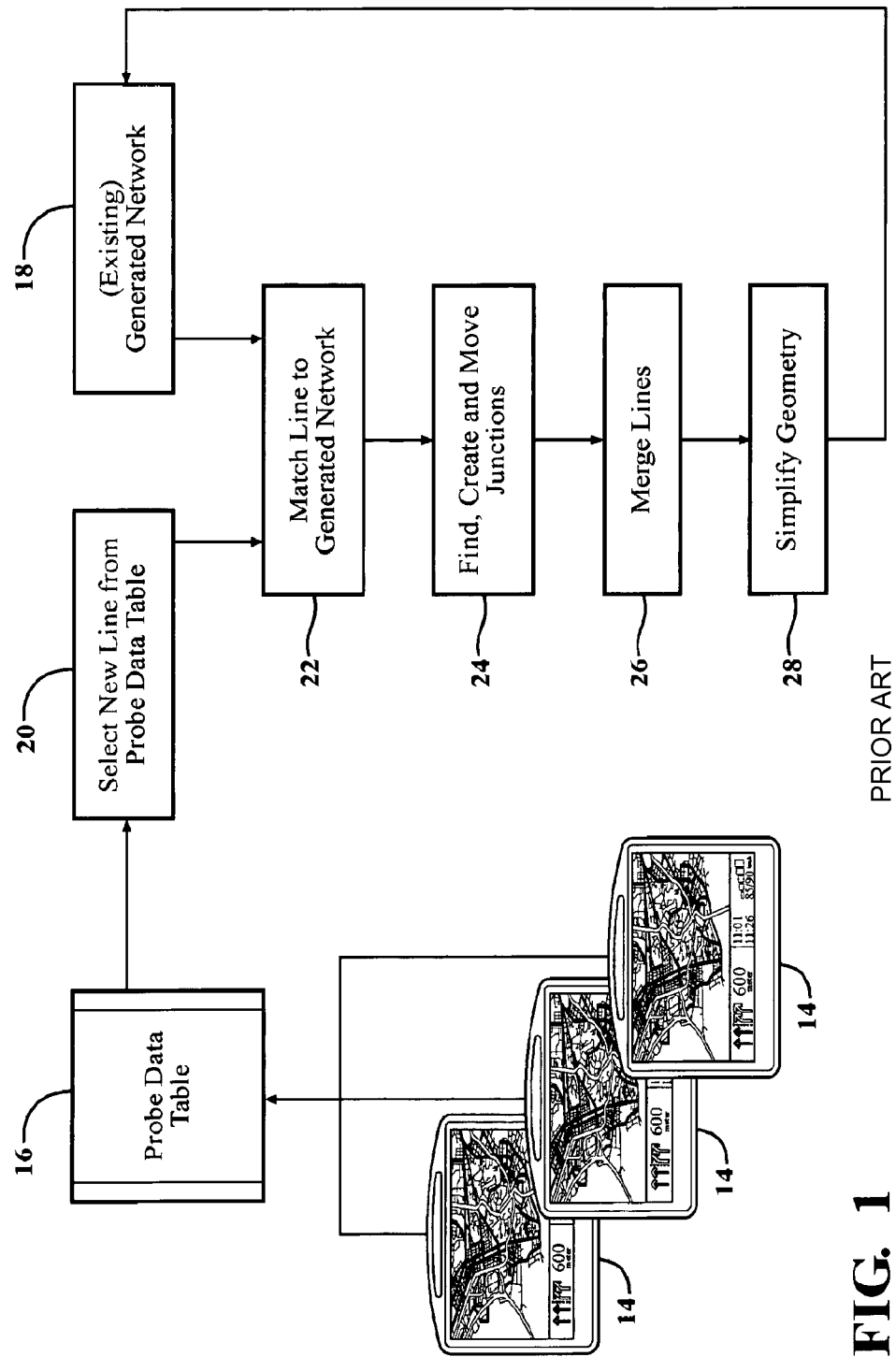
FIG. 1 is a schematic diagram depicting a process for collecting probe (trace) data from a plurality of GPS-enabled navigation devices, storing the probe data in a table, and then matching individual traces to line segments in a digital vector map for the purpose of improving and/or extending a digital vector map.
Figure 2:
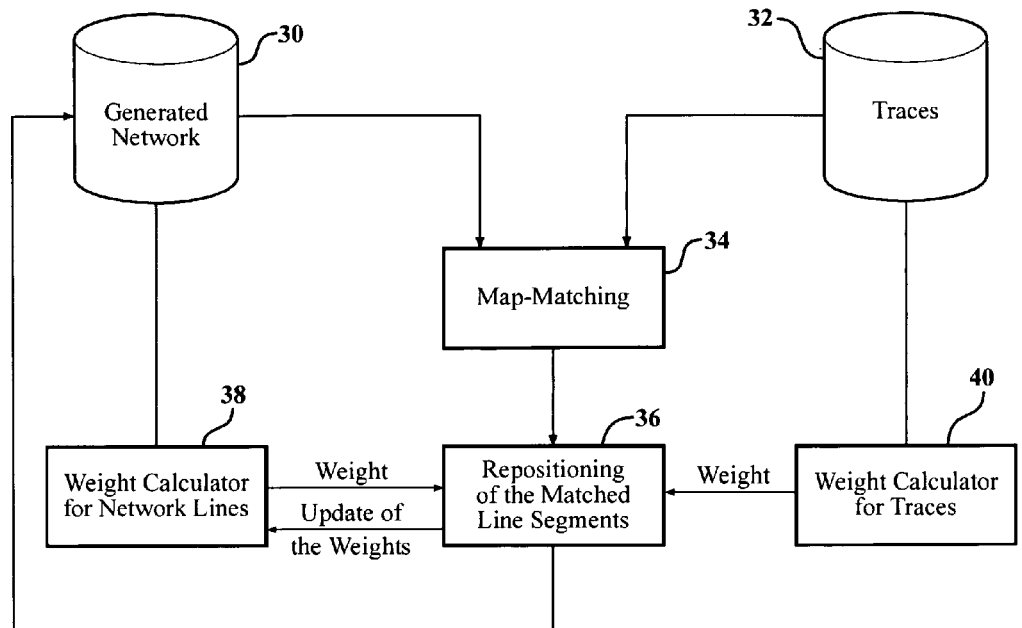
FIG. 2 is generalized flow diagram for generating, refining and/or extending a digital vector map using traces derived from probe data according to the invention.

Referring to the figures, wherein like numerals indicate like or corresponding parts throughout the several views, the subject invention is described schematically in FIG. 2 as a generalized flow diagram for generating, refining and/or extending a digital vector map using traces derived from probe (i.e., trace) data. The method generally includes providing a digital vector map configured to store a plurality of line segments spatially associated within a coordinate system. This is represented in FIG. 2 as a generated network 30. The generated network 30 stores at least one line segment, and more typically a substantial plurality of line segments. Each line segment has an associated line weight value that has been confirmed in relation to a specified date. For example, the line weight value may be comprised of a calculated sum of the individual trace weights historically collected and matched to the line segment according to a suitable method like that shown perhaps in the Viae Novae algorithm.

At least one probe trace is provided from any suitable source. Often, a plurality of traces will be provided in connection with ongoing data collection efforts or perhaps acquired in bulk from a particular source of data. The traces are shown in FIG. 2 as a database or table 32. Each probe trace has a defined creation date. The creation date is typically the time-stamped date on which the trace was generated, although another creation date may be assigned. A trace weight value is assigned to the trace in relation to its creation date. Most often, the assigned trace weight value will be 1 for every trace irrespective of its creation date, although another weight value could be used.

A matching step is depicted at 34. In this step, each trace is matched to a particular line segment in the generated network. Any suitable algorithm may be used for the step, including both incremental and non-incremental approaches like those described above. In some cases, the algorithm may be unable to map a trace to an existing line segment, in which case a new line segment is created (or an existing line segment is extended).

Next, the matched line segments are repositioned (or attributes thereof altered) at step 36. According to this invention, a recalculation date is established. This recalculation date may corresponds to (or closely precedes) the real time date at which the repositioning step 36 is carried out, although substantially varied recalculation dates may be established for particular purposes such as merging two line segments.

The invention includes the step of adjusting the value of at least one of the line weight and trace weight as a function of the time span between the recalculation date and one of the line segment specified date and trace creation date. This adjusting step is represented by either one or both function blocks 38, 40 shown in FIG. 2. The adjusting step carried out in function blocks 38, 40 may be the same or different, as described further below. More particularly, the adjusting step may comprise reducing the line weight value in function block 38 as a function of the time span between the recalculation date and the line segment, or as a function of the time span between the recalculation date and the trace creation date. Alternatively, the adjusting step may comprise reducing the trace weight value in function block 40 as a function of the time span between the recalculation date and the trace creation date. These alternative methods are described more fully below in connection with FIGS. 4-10.

Those of skill in the art will understand that, in general, a network generation method does not in all cases need the map matching step 34. Non-incremental network generation methods usually do not use a map matching step 34. The map matching step 34 is primarily useful for the incremental network generation. Further still, non-incremental network generation methods usually do not use a line weight. Often, they only use the weights of the traces. On the other hand such methods may compute line weights e.g. to equip the generated network with an additional line attribute.

Figure 3:
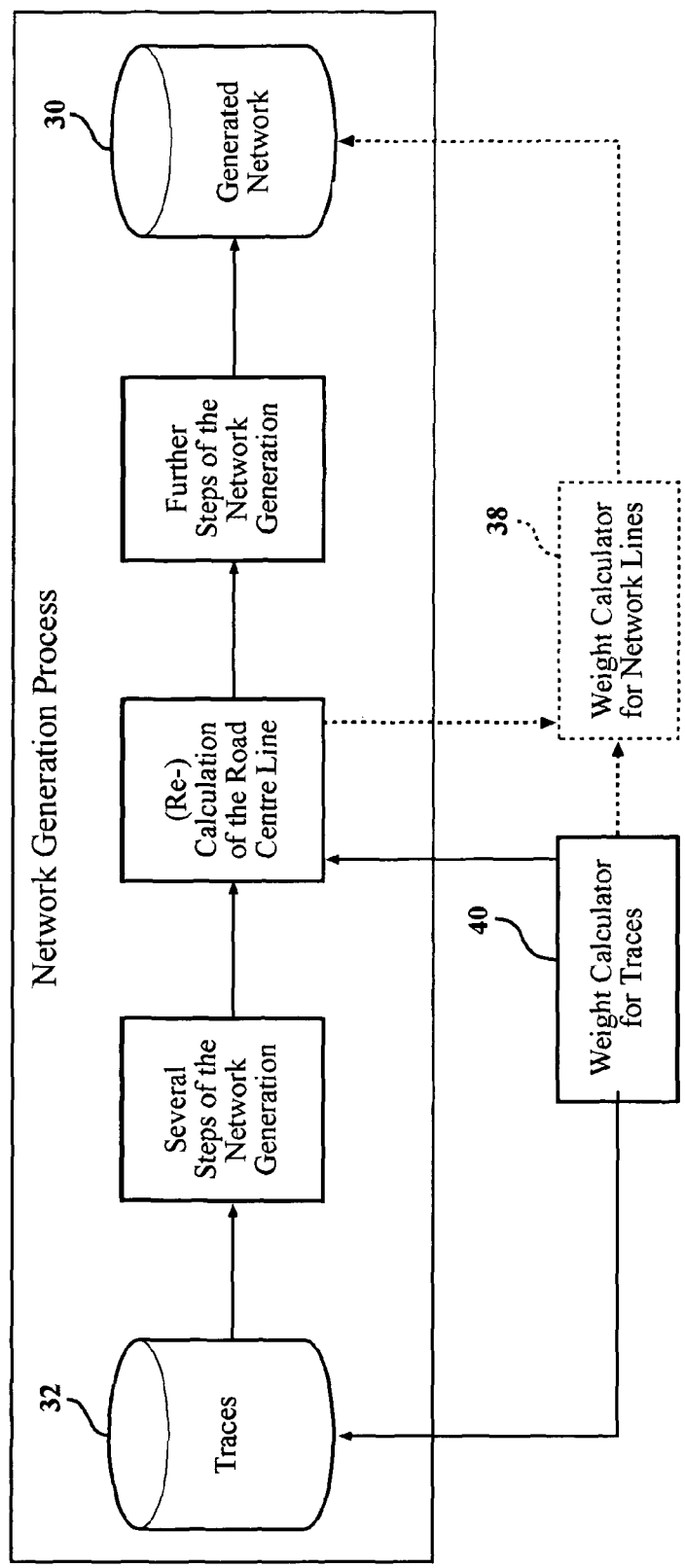
FIG. 3 is still more generalized flow diagram for the invention.

FIG. 3 describes a more general case, in contrast to FIG. 2 which describes an incremental network generation process. The flow chart of FIG. 3 covers a more general case—including both incremental and non-incremental approaches. The central step is a calculation or re-calculation of the road centre line. This corresponds more or less to the Repositioning step 36 shown in FIG. 2. The Weight Calculator for Network Lines 38 is indeed optional, and for this reason shown in dashed outline. Some algorithms may require the line weights, but others not. Even if not required, it is possible to use step 38 in order to compute the line weight as an additional attribute for the road network. All other aspects and applicability of the flow chart shown in FIG. 3 will be readily apparent to those of skill in the field.

Figure 4:
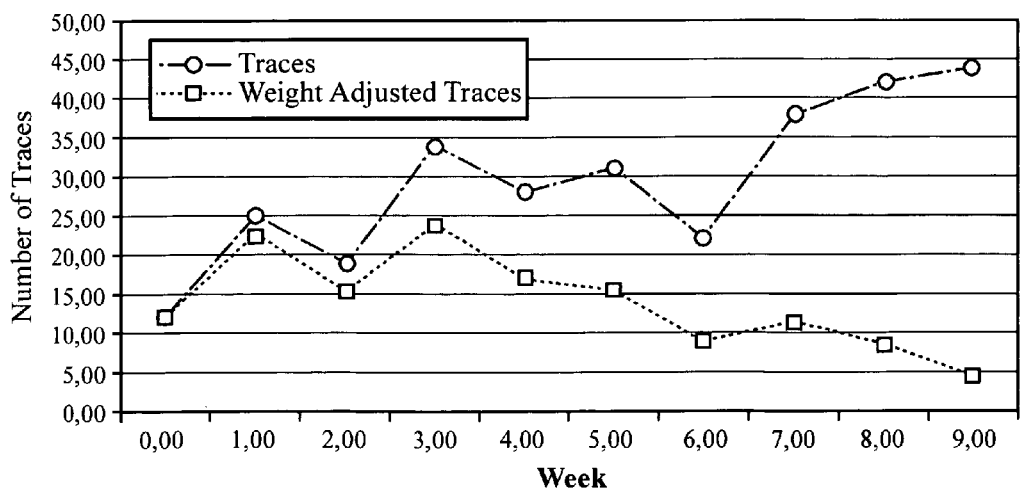
FIG. 4 is a comparative graph showing the effects of adjusting trace weights as a function of time-span from a recalculation date (Week 0,00) according to a first alternative embodiment of the invention.

A first proposed method for the adjusting step uses a defined maximal time period measured rearwardly from the recalculation date. This maximal time period is divided into a plurality of bins. Each bin represents a respective portion of time between the recalculation date and the maximal time period. FIG. 4 graphically shows the effects of adjusting trace weights as a function of time-span from any given recalculation date (Week 0,00).

For example, one might define a maximal time period of 1 year preceding the recalculation date, and divide this period into 12 bins corresponding each to one month. If, in this example, the recalculation date is January 1 of a given year, the bins would correspond, respectively, to the twelve immediately preceding months of the previous year. Still further according to this method, each bin is assigned a factor. The traces (from database 32) are each associated with a specified one of the bins corresponding to their trace creation date. For each trace, its weight value is then calculated as a function of the factor assigned to the bin with which that particular trace is associated. All traces older than the specified maximal time period get the weight 0. Effectively, this means that traces that are not assigned to a bin are not used.

For each line segment (respectively for each shape point), a table or list is stored with entries for each bin. Each entry contains the number of traces in a particular time window. As described, each of the bins has a certain factor which depends from the time window. In order to compute a cumulative weight for each bin, the number of traces of each bin is multiplied with the assigned factor. The total weight for the line segment is then determined as the sum of the weights of the bins.

According to prior art techniques, a weight value for a line segment is determined by simply adding the number of traces previously mapped to it (assuming that each trace weight value is 1). Thus, if a particular line segment has 295 historic traces mapped to it, then the line weight value for that line segment is 295. Taking a comparative example, assume that a maximal time period is defined as 10 weeks, and that a bin length of one week is deemed adequate, so that ten separate bins of time are established. Assume still further that all 295 historic traces mapped to the line segment have creation dates within the maximal time period of the 10 weeks preceding a recalculation date. Using the principles of this invention, the 295 traces are sorted according to the bins into which their respective creation dates correspond. The following Table 1 shows an example of the weights for each bin for a time period of 10 weeks and a bin length of one week:

TABLE 1

| | Week | | | | | | | | | |
|---|---|---|---|---|---|---|---|---|---|---|
| | 0 | 1 | 2 | 3 | 4 | 5 | 6 | 7 | 8 | 9 |
| Weight | 12 | 25 | 19 | 34 | 28 | 31 | 22 | 38 | 42 | 44 |

In this example, 12 traces of the week immediately preceding the recalculation date are placed in the first bin; 25 traces having creation dates falling within the second week preceding the recalculation date; and so on. Hence all 295 traces used to compute this line segment are accounted for within this hypothetical example. If one adds a new trace to the line segment which is 4 weeks old, the table is updated at the corresponding bin as shown below in Table 2:

TABLE 2

| | Week | | | | | | | | | |
|---|---|---|---|---|---|---|---|---|---|---|
| | 0 | 1 | 2 | 3 | 4 | 5 | 6 | 7 | 8 | 9 |
| Weight | 12 | 25 | 19 | 34 | 29 | 31 | 22 | 38 | 42 | 44 |

According to this one possible implementation method of the invention, rather than simply adding the weights of all the traces to achieve a line weight value of 295 (or 296 in the example of Table 2), factors are assigned to each bin. If a linear progression is chosen, the factor for week 0 may be set at "1" and each successive week decreased by 0.1. Thus, the older the trace data the lower its factor. Any non-negative and non-increasing function can be used. In the case of a linear decreasing function, the following Table 3 offers an example of the factor assigned to each bin, and the resulting adjusted weight value of each bin:

TABLE 3

| | Week | | | | | | | | | |
|---|---|---|---|---|---|---|---|---|---|---|
| | 0 | 1 | 2 | 3 | 4 | 5 | 6 | 7 | 8 | 9 |
| Factor | 1 | 0.9 | 0.8 | 0.7 | 0.6 | 0.5 | 0.4 | 0.3 | 0.2 | 0.1 |
| Initial Weight | 12 | 25 | 19 | 34 | 28 | 31 | 22 | 38 | 42 | 44 |
| Adjusted Weight | 12 | 22.5 | 15.2 | 23.8 | 16.8 | 15.5 | 8.8 | 11.4 | 8.4 | 4.4 |

Figure 5:
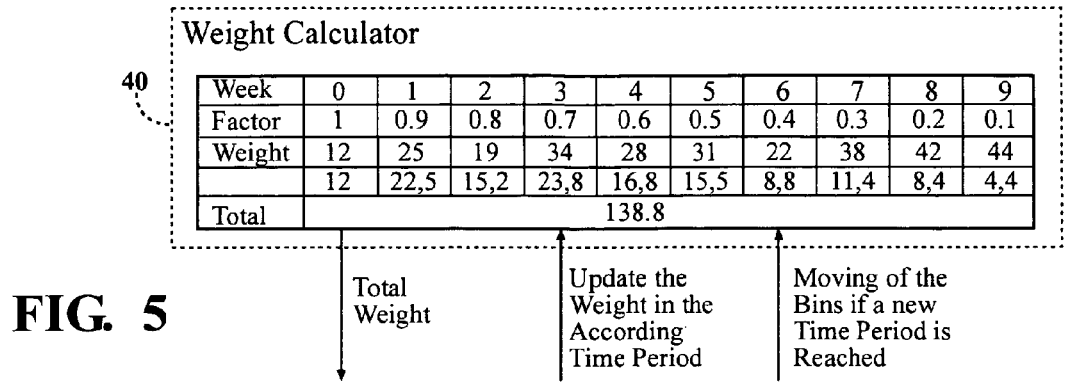
FIG. 5 is a simplified diagram corresponding to Table 3, illustrating an implementation scheme according to the first alternative embodiment of the invention.

According to this implementation method, therefore, the weight or contribution of each bin to the line weight value of the line segment is a function of the number of traces in the bin and the factor applied to that bin. Summing the adjusted weights of the bins, a total adjusted weight value of 138.8 is computed for this particular line segment. This can be compared to the line weight value of 295 achieved with prior art techniques. In the same manner, if a trace that is 4 weeks old is added, as in Table 2, then that newly added trace contributes only a weight value of 0.6. After the merging of the new trace to the line segment, the total weight value of the line segment will be 139.4 (instead of 296). FIG. 5 is a simplified diagram illustrating an implementation scheme corresponding to Table 3.

When a new week begins (i.e., relative to the recalculation date), all of the tables are updated. As a result, all weight values in the table have to shift one week as in the example shown in Table 4. If no new traces are mapped to the line segment in the new week, then the weight contribution of the week immediately preceding the recalculation date (i.e., week "0") is set to 0.

TABLE 4

| | Week | | | | | | | | | |
|---|---|---|---|---|---|---|---|---|---|---|
| | 0 | 1 | 2 | 3 | 4 | 5 | 6 | 7 | 8 | 9 |
| Weight | 0 | 12 | 25 | 19 | 34 | 29 | 31 | 22 | 38 | 42 |

If the weight contribution is 0 for every bin, it means that the line segment does not have any traces mapped to it for the entire maximal time period. This could mean that the road corresponding to the line segment was not used during the whole time period, and possibly that it is appropriate to remove the line segment from the generated network 30.

Figure 6:
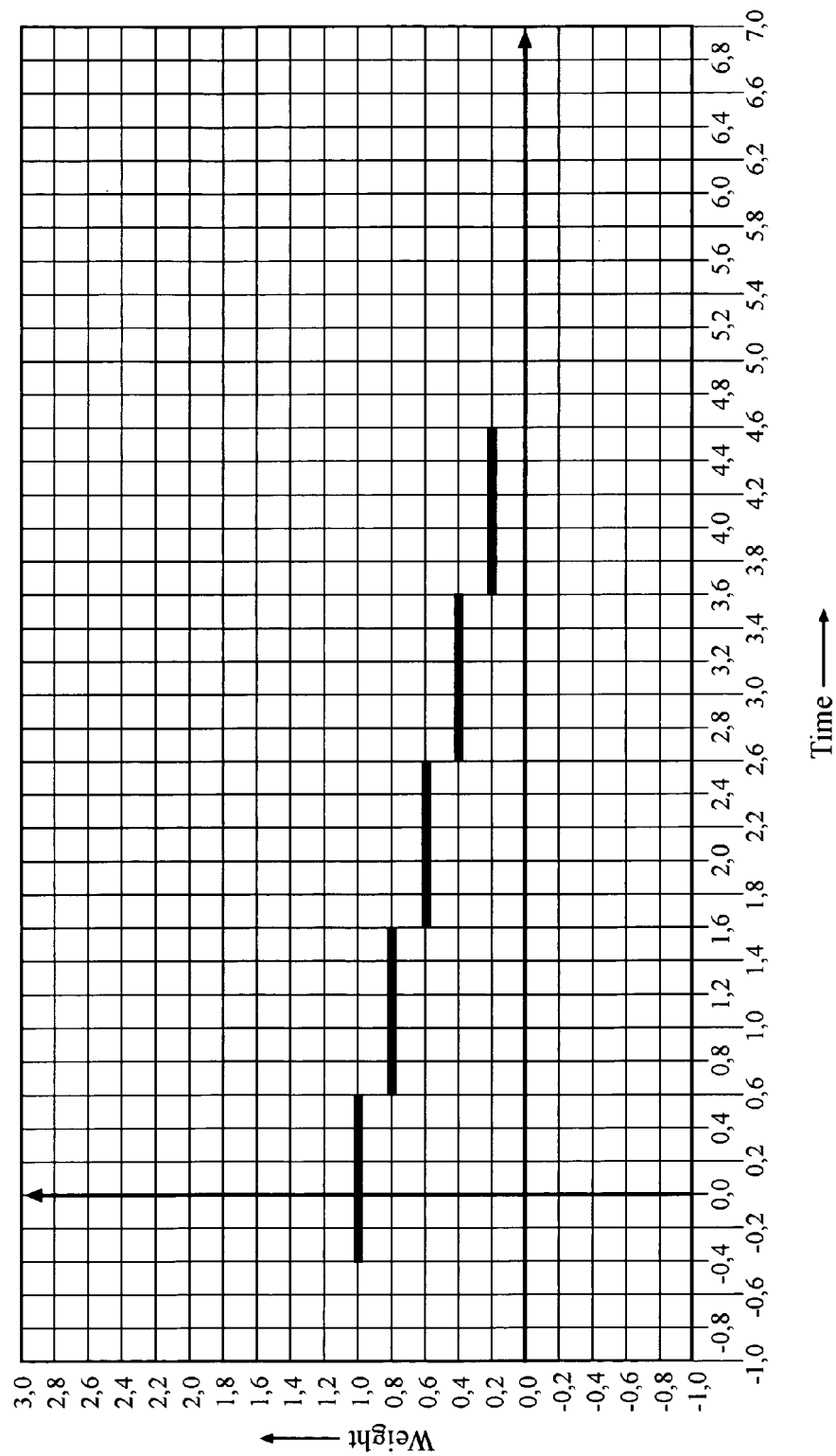
FIG. 6 is a graph illustrating the progressive nature of the factors applied to time bins constructed in accordance with the first alternative embodiment.

FIG. 6 graphically depicts the progressive nature of factors applied to time bins constructed in accordance with this first alternative embodiment.

In addition to using the sum of the weights of the traces factored according to their creation dates (relative to the recalculation date), the contributions of each bin to the weight value of the line segment can be varied using other criteria. For example, it is possible that the weights also depend from the accuracy of the individual trace points. In this case the weight values in the tables may be floating-point numbers. For instance, the trace points may be classified into four accuracy classes. The accuracy value (ACC) might depend from the reception conditions of the GPS satellites at the time of the creation date, or from the type of probe used to generate the trace, or from the trace source, or other factors. As but one simple example, the accuracy values can be 0, 1, 2 or 3. The points with the highest accuracy have the ACC-value 3 and the points with the lowest accuracy are in the class 0. To include the ACC-values in the weight values one might set for every ACC-class $k \in \{0,1,2,3\}$ a factor $w_k \in [0,1]$. For the highest accuracy 3 we should set $w_3=1$. The lower the ACC-value, the lower should be the factor. For instance one might use the following values:

TABLE 5

| ACC | $w_k$ |
|---|---|
| 3 | 1 |
| 2 | 0.8 |
| 1 | 0.6 |
| 0 | 0.4 |

For a single trace point the weight is equal to the value $w_k$ (multiplied with the time factor described above). For a point on a trace between two trace points, one can use the weighted mean between the values $w_k$ of the two neighboring trace points. In the same manner one can use other values to adjust the weights. For instance one can use the resolution of the devices. It is also possible to reduce weight of certain devices or software versions.

Figure 7:
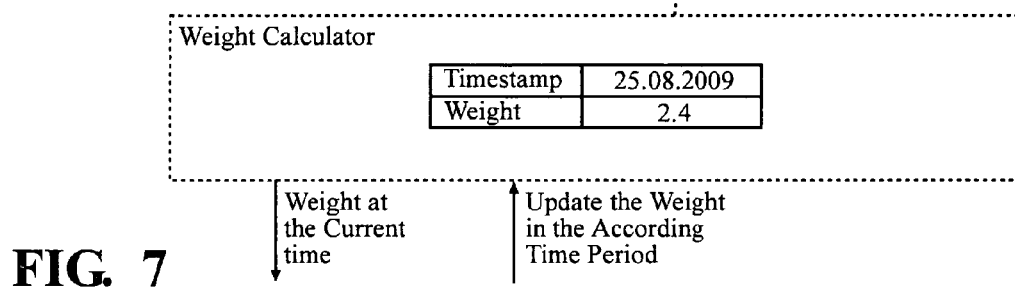
FIG. 7 is a simplified diagram illustrating a hypothetical implementation scheme according to a second alternative embodiment of the invention.
Figure 8:
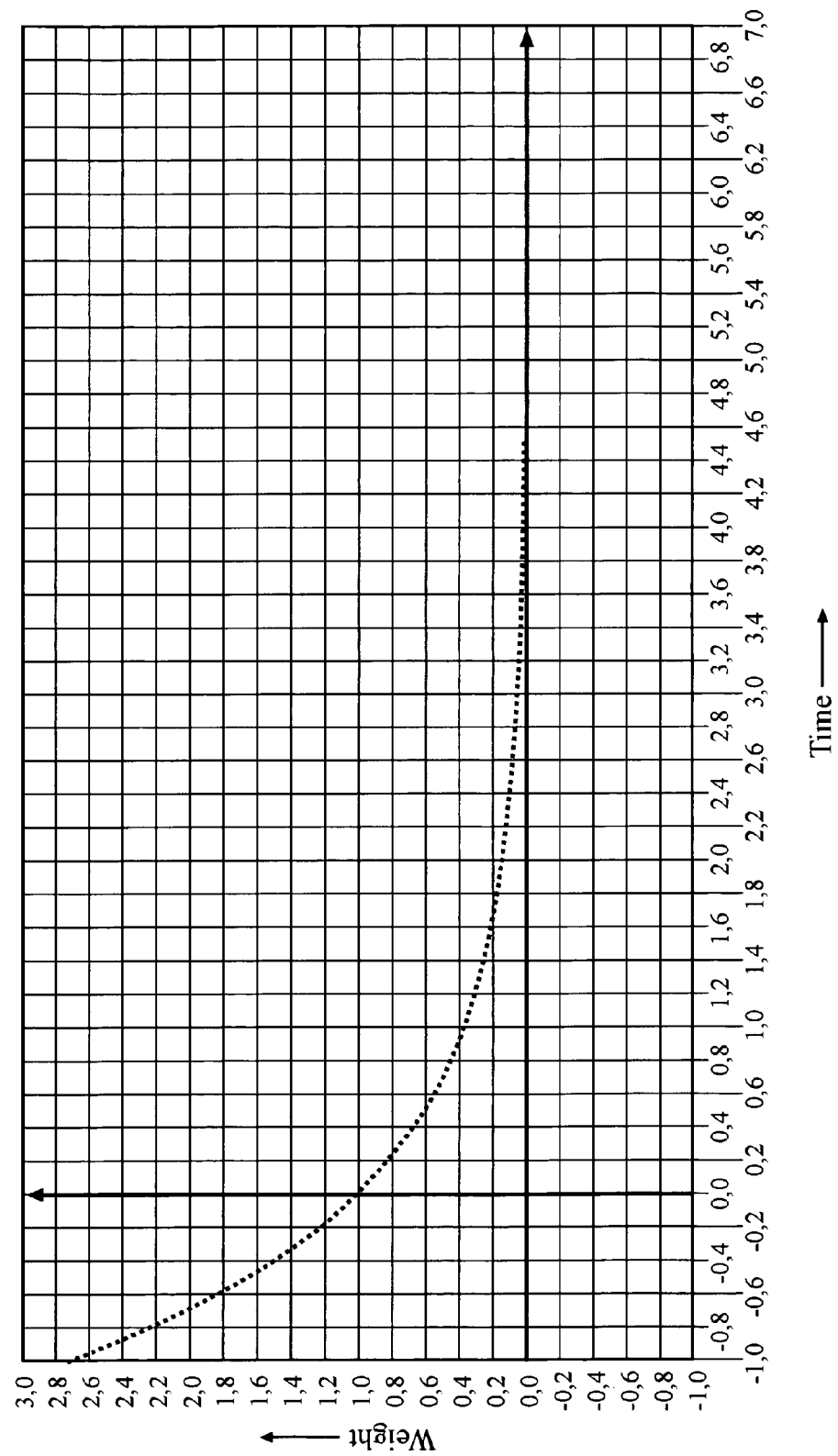
FIG. 8 is a simplified graph showing the exponential decay of the line and/or trace weight according to the second alternative embodiment.

The second alternative approach uses a half-life concept to determine a line weight value 38 (or trace weight value 40), and is described here in cooperation with FIGS. 7 and 8. In comparison to the preceding technique, the half-life concept may be preferred in situations where many bins are used, due to the need to shift large numbers of bins after each time step. In order to avoid this disadvantage one can use the half-life concept. According to this method, a half-life time T is defined. If the line weight value at any given time (i.e., a "specified date") is known, then it is possible to compute the weight at any other time (i.e., the "recalculation date"). With this concept one has only two values to store: a line weight $w_0$ at a certain timestamp (the specified date). A similar approach may be used to compute trace weight values in step 40.

In practice, it may be necessary at times to merge two line segments. In this case, the line weight values for each line segment can be computed for a common time and then merged. For example, respective line segments A and B are to be merged. Line segment A has a weight value X specified as of May 1, 2009, whereas line segment B has a weight value Y specified as of Oct. 1, 2009. If a common recalculation date is selected as Jan. 1, 2010, for example, then the weight values of the two line segments are each adjusted with reference to Jan. 1, 2010 (as the recalculation date) using the decay function. Once weight values of the line segments A,B have been adjusted with reference to a common recalculation date in this manner, they can be merged using a suitable algorithm. Therefore, according to this technique, one computes an adjusted weight for each line segments at the same timestamp (recalculation date) and then adds the weights or otherwise refines the digital map. With this approach only an exponential decay function is possible.

A half-life period T is determined which, for purposes of example, could be a month. This means that after a month a trace (and/or line segment) will have only half of its initial weight. If the weight for a trace (and/or a line segment) is $w_0$ at a certain time stamp (i.e., specified date), then the weight w(t) after a time t is computed with $$w(t) = w_0 \cdot \left(\frac{1}{2}\right)^{\frac{t}{T}}.$$

For example, there is a line segment with a weight value of 263.8 and a time stamp of the 2 Aug. 2009. If the recalculation date is the 17 Aug. 2009, the time difference is t=15 days. Assuming a half-life 30 days, as of the recalculation date the line segment has a weight value of:

$$w(t) = w_0 \cdot \left(\frac{1}{2}\right)^{\frac{t}{T}} = 263.8 \cdot \left(\frac{1}{2}\right)^{\frac{15}{30}} = \frac{263.8}{\sqrt{2}} \approx 186.53.$$

Next, suppose there is a trace from the 18 Jun. 2009 (its creation date) which matches to this line segment. Furthermore, assume that the weight of the trace on the 18 June is 1. The adjusted weight value of the trace as of a 17 Aug. 2009 recalculation date is $$w(t) = w_0 \cdot \left(\frac{1}{2}\right)^{\frac{t}{T}} = 1 \cdot \left(\frac{1}{2}\right)^{\frac{60}{30}} = 0.25.$$

Now, as the trace and the line segment share a common recalculation date, their weight values can be summed to compute a new, resulting line weight value. Thus, after merging this trace to the line segment, the updated line segment has a weight value of 186.78 and a new time stamp (specified date) of 17 Aug. 2009.

FIG. 6 is a simplified diagram illustrating a hypothetical implementation scheme of this approach. As can be seen from FIG. 8, if a line segment is not used during a long time, the current weight decrease exponentially. However the weight will never be 0. In order to remove unused line segments, one can set a threshold and remove the line segments with a current total weight lesser than the threshold. Because there is no shifting step after each time step like in the first approach, unused line segments can be removed in this manner from time to time. It is also possible to store additionally for every line segment (respectively to each shape point) the expiry date when the weight falls under the threshold. Then one can remove these line segments if the expiry date is reached. Because at the expiry date the weight equals the threshold, one can compute the weight for every date. Therefore the expiry date can replace the stored date and weight; one has only to store one value. Instead of the expiry date, one can also store the date when any other weight is reached, such as the weight 1.

Figure 9:
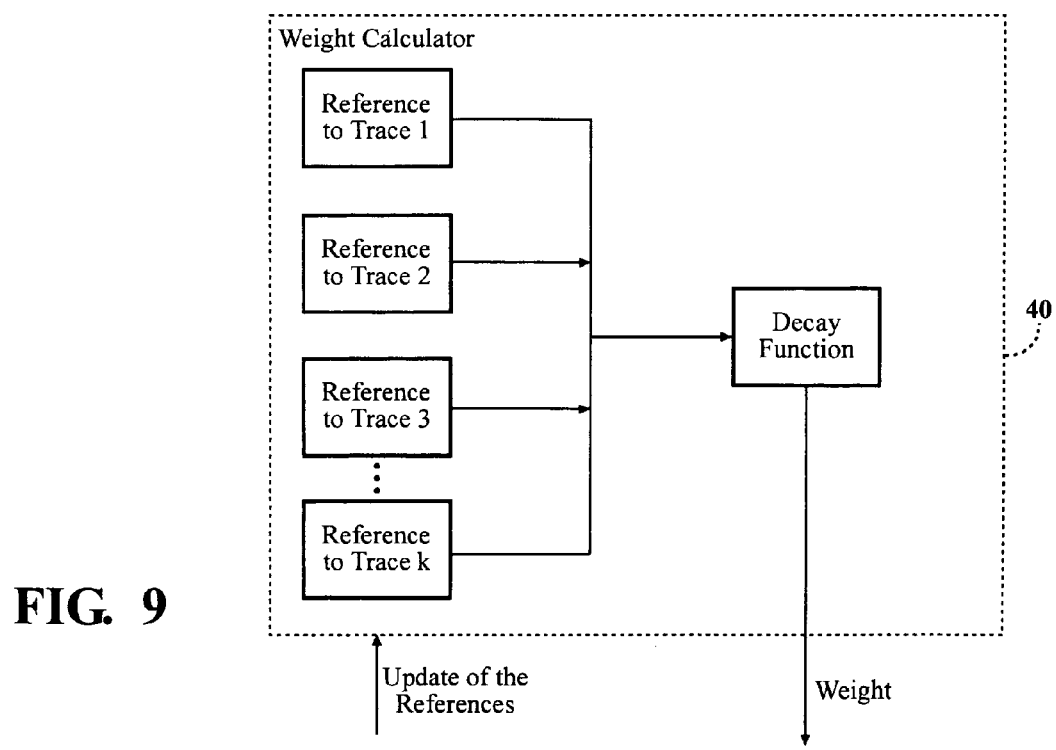
FIG. 9 a simplified diagram illustrating an implementation scheme according to a third alternative embodiment of the invention.

FIG. 9 is a simplified diagram illustrating an implementation scheme according to this third alternative embodiment of the invention. Of course it is possible to compute with this formula the weight for each time stamp in the past as well as in the future. It is also possible that the weight depends from the accuracy and other values like is described above.

Figure 10:
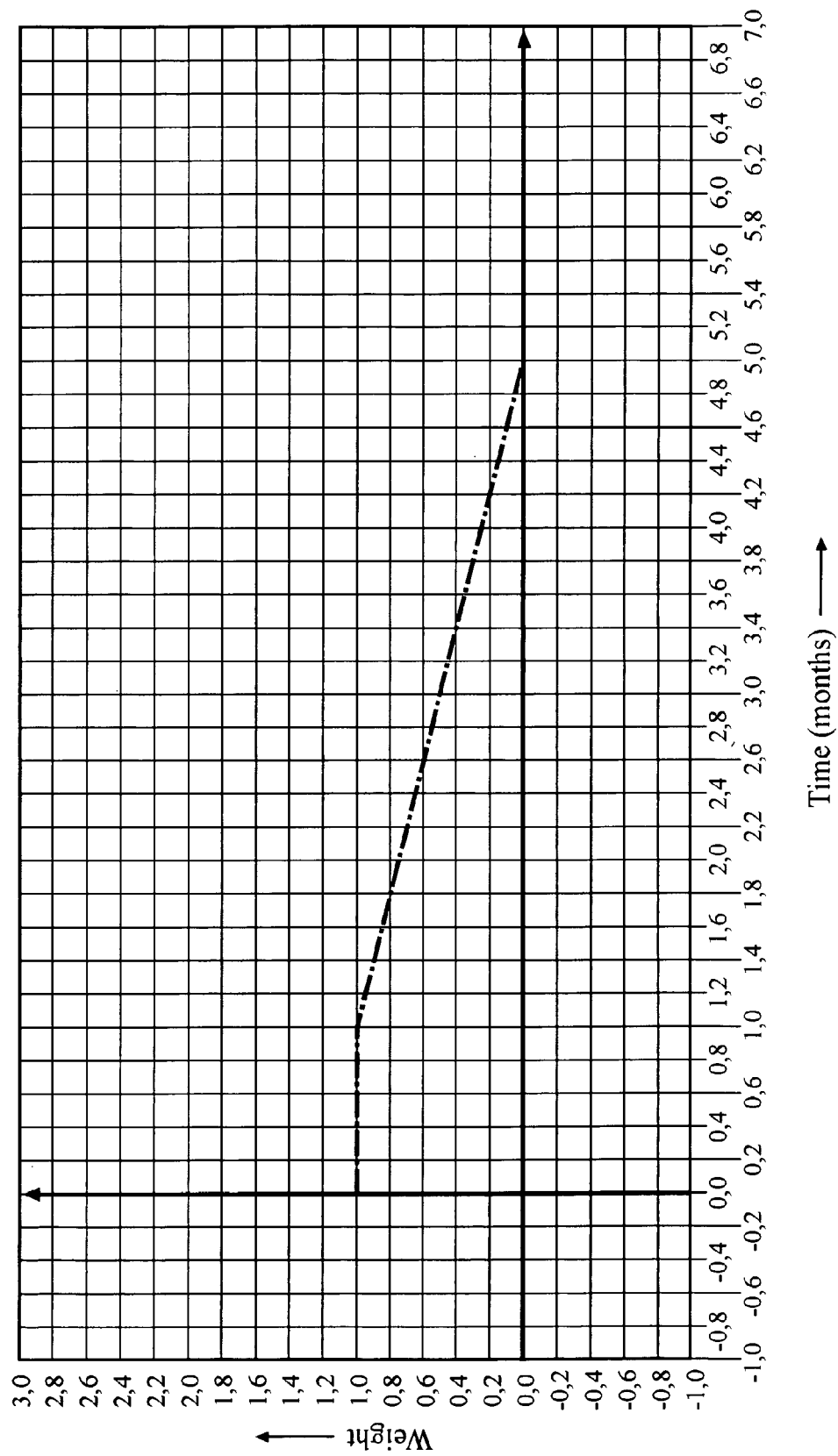
FIG. 10 shows an exemplary alternative decay function according to the third alternative embodiment of the invention.

According to a still further alternative approach, as referenced in FIGS. 9 and 10, the trace weight values with their respective corresponding creation dates can be used to compute the line weight value for a line segment to which the traces have been matched 34. This approach allows use of any decay function to reduce the weight depending on the timestamp. For each trace the weight value is computed with the used decay function. The total weight of a line segment is then the sum of the weights of all used traces. This approach provides a flexible way to compute the line segment weights.

This approach is distinguished from the first two approaches by using the trace references to compute the weight for a line segment. This approach allows the use of any function to reduce the weight depending on the time stamp. FIG. 10 illustrates an example of this alternative decay function for the weight. Until one month a trace is accepted as a new trace; in this time it keeps the weight of 1. After one month until five months, the weight decreases linearly. After five months the weight of the trace is 0. Many alternative functions are possible in this approach. In general, these decay functions are non-increasing. However for special applications other decay functions are also possible. For instance if one wants to compute how a road network was at a certain time in the past, a bell shape curve can be used.

In order to compute the total weight for a line segment (respectively to a shape point), one uses the references to the traces from which the line was generated. For each trace the weight is computed with the decay function described above. The total weight of the line segment is then the sum of the weights of all used traces. Of course it is possible to consider again the accuracy of traces and other values as described above.

This approach can be applied in any number of ways to compute line weight values under given conditions. It is also possible to change the decay function during the network generation process. However this approach may be somewhat disadvantaged relative to the other proposed approaches due to its rather higher computation effort because access to the database to obtain the dates of all referenced traces may require a substantial amount of time.

Collectively therefore, the invention describes a method for network generation from probe (trace) data in which time-dependent influences are used to adjust the weight values for the line weight and/or trace weight data. Three alternative approaches are proposed in order to consider the time dependency of probe (trace) data in connection with network generation algorithms, both incremental and non-incremental, but these are provided by way of example and not to be considered exclusive approaches to implementing the principles of this invention. These methods may be used, for example, in conjunction with the Viae Novae algorithm. However these methods are also useful for many other data mining activities where time-depending data are used. Furthermore, in appropriate circumstances, these methods could be used in various combinations with one another. And still further, additionally or alternatively, factors such as accuracy, resolution or device or software depending values can be considered in a weight adjustment model.

It will be understood that the general concepts of this invention can be used to improve any digital (vector) map, not only roadway and pathway maps. For example, circuit diagrams, schematics, and other graphical representations that can be spatially associated within a coordinate system may benefit from the techniques of this invention.

Those of skill in this field may envision various improvements and extensions of this technology. For example, with these techniques, it is foreseeable to incorporate the computation of several road attributes like average speed, road classification, altitude and slope values. Furthermore, confidence models and/or codes can be developed from these concepts for the generated geometry as well as its attributes. By these techniques, network elements generated from old data can be kept up to date without overloading data storage or data processing resources.

Elements and/or features of different example embodiments can be combined with each other and/or substituted for each other within the scope of the disclosure and appended claims.

Still further, any one of the above-described and other example features can be embodied in the form of an apparatus, method, system, computer program and computer program product. For example, any of the aforementioned methods may be embodied in the form of a system or device, including, but not limited to, any of the structure for performing the methodology illustrated in the drawings.

Whilst embodiments described in the foregoing detailed description refer to GPS, it should be noted that the navigation apparatus may utilise any kind of position sensing technology as an alternative to (or indeed in addition to) GPS. For example, the navigation apparatus may use other global navigation satellite based such as the European Galileo system. Equally, it is not limited to satellite based, but could readily function using ground based beacons or any other kind of system that enables the device to determine its geographic location.

The foregoing description of the invention is exemplary rather than limiting in nature. Variations and modifications to the disclosed embodiment may become apparent to those skilled in the art and fall within the scope of the invention. Accordingly, the scope of protection afforded to this invention is defined only by the following claims.

What is claimed is:

1. A method for generating, refining and/or extending a digital map using traces derived from probe data, said digital map storing a plurality of line segments spatially associated within a coordinate system, at least one, and preferably all, of the line segments having an associated segment weight value, the method comprising a computer performing the steps of:
providing at least one probe trace having a defined creation date;
assigning a trace weight value to the at least one probe trace;
adjusting the position of a line segment associated with the at least one probe trace based on the segment weight value of the line segment and the trace weight value;
adjusting at least one of the trace weight value and the segment weight value as a function of the time span between a recalculation date and the trace creation date, comprising:
dividing a maximal time period into a plurality of bins, each bin representing a respective portion of time between the recalculation date and the maximal time period;
assigning each bin a factor;
associating the trace with a specified one of the bins corresponding to the trace creation date; and
calculating the trace weight value as a function of the factor assigned to the bin associated with the trace;
removing a line segment from the digital map when a segment weight value of the line segment falls below a threshold.

2. The method of claim 1, wherein at least one, and preferably all, of the line segments have a computed centreline and the step of adjusting the position of a line segment comprises recalculating the centreline of the line segment, optionally using a weighted average of the segment and trace weight values.

3. The method of claim 1, wherein said step of adjusting the trace weight value and/or the segment weight value comprises reducing the trace weight value as a function of the time span between the recalculation date and the trace creation date.

4. The method of claim 1, wherein the segment weight value is calculated as a sum of the weights of the bins.

5. The method of claim 1, further comprising defining a half-life time (T) and a decay function, preferably an exponential decay function, and wherein said adjusting step includes computing at least one of the segment weight value and trace weight value as a function of the half-life time (T) and the decay function.

6. The method of claim 5, wherein said computing step includes altering the trace weight value and/or the segment weight value as a function of the half-life time (T) and the decay function.

7. The method of claim 1, wherein said step of assigning a trace weight value includes assigning an equal and common initial weight value to a plurality of traces having different respective creation dates.

8. The method of claim 1, wherein the digital map is a transportation network, and preferably the line segments represent at least a portion of a road.

9. The method of claim 1, wherein the predetermined threshold is zero or a value greater than zero.

10. The method of claim 1, wherein a predicted expiry date is determined for a line segment based on when the segment weight value will fall below a predetermined threshold value, and the line segment is removed from the digital map when the expiry date is reached.

11. The method of claim 10, wherein the predicted expiry date is adjusted, preferably extended, as additional probe traces associated with the line segment are provided.

12. The method of claim 1, wherein the trace weight value assigned to the at least one probe trace is based on at least one of accuracy and precision criteria of the acquisition system used to obtain the probe trace.

13. A method for generating, refining and/or extending a digital map using traces derived from probe data, said digital map storing a plurality of line segments spatially associated within a coordinate system, at least one, and preferably all, of the line segments having an associated segment weight value, the method comprising a computer performing the steps of:
 providing at least one probe trace having a defined creation date;
 assigning a trace weight value to the at least one probe trace;
 creating a line segment associated with the at least one probe trace;
 assigning a segment weight value to the line segment based on the trace weight value;
 adjusting at least one of the trace weight value and the segment weight value as a function of the time span between a recalculation date and the trace creation date, comprising:
  dividing a maximal time period into a plurality of bins, each bin representing a respective portion of time between the recalculation date and the maximal time period;
  assigning each bin a factor;
  associating the trace with a specified one of the bins corresponding to the trace creation date;
  calculating the trace weight value as a function of the factor assigned to the bin associated with the trace; and
 removing a line segment from the digital map when a segment weight value of the line segment falls below a threshold.

14. The method of claim 13, wherein at least one, and preferably all, of the line segments have a computed centreline and the step of creating a line segment comprises calculating a centreline for the line segment.

15. The method of claim 13, wherein:
 said step of providing at least one probe trace comprises providing a plurality of probe traces each having a different creation date; and
 said step of assigning a trace weight value to the at least one probe trace comprises assigning the same trace weight value to each of the plurality of probe traces at the respective creation date of the probe trace.

16. A non-transitory computer readable medium having computer software stored thereon, said computer software operable, when executed on a computer, to cause the computer to perform the method of claim 1.

17. A non-transitory computer readable medium having computer software stored thereon, said computer software operable, when executed on a computer, to cause the computer to perform the method of claim 13.

* * * * *